United States Patent [19]

Takayama et al.

[11] Patent Number: 4,706,132
[45] Date of Patent: Nov. 10, 1987

[54] VIDEO SIGNAL PROCESSING SYSTEM

[75] Inventors: Makoto Takayama; Nobuaki Sakurada, both of Kanagawa, Japan

[73] Assignee: Canon Kabushiki Kaisha, Tokyo, Japan

[21] Appl. No.: 715,082

[22] Filed: Mar. 22, 1985

[30] Foreign Application Priority Data

Mar. 23, 1984 [JP] Japan .................................. 59-56693

[51] Int. Cl.⁴ ............................................. H04N 5/94
[52] U.S. Cl. .................................... 358/336; 358/166
[58] Field of Search ................. 358/336, 342, 22, 180, 358/183, 160, 166; 360/38.1, 33.1, 10.1, 10.3; 371/38, 40

[56] References Cited

U.S. PATENT DOCUMENTS

| 4,163,249 | 7/1979 | Michael et al. | 358/22 |
| 4,200,890 | 4/1980 | Inaba et al. | 358/22 |
| 4,266,242 | 5/1981 | McCoy | 358/22 |

Primary Examiner—Donald McElheny, Jr.
Attorney, Agent, or Firm—Toren, McGeady & Associates

[57] ABSTRACT

A video signal processing system including an A/D converting circuit for analog-to-digital converting an input video signal; a storing circuit for storing data produced from the A/D converting circuit; a coefficient multiplying circuit for multiplying the data stored at the storing circuit by coefficients; and a control circuit for controlling the coefficients for the coefficient multiplying circuit in obtaining a scanning line interpolation signal or a drop-out compensating signal.

44 Claims, 14 Drawing Figures

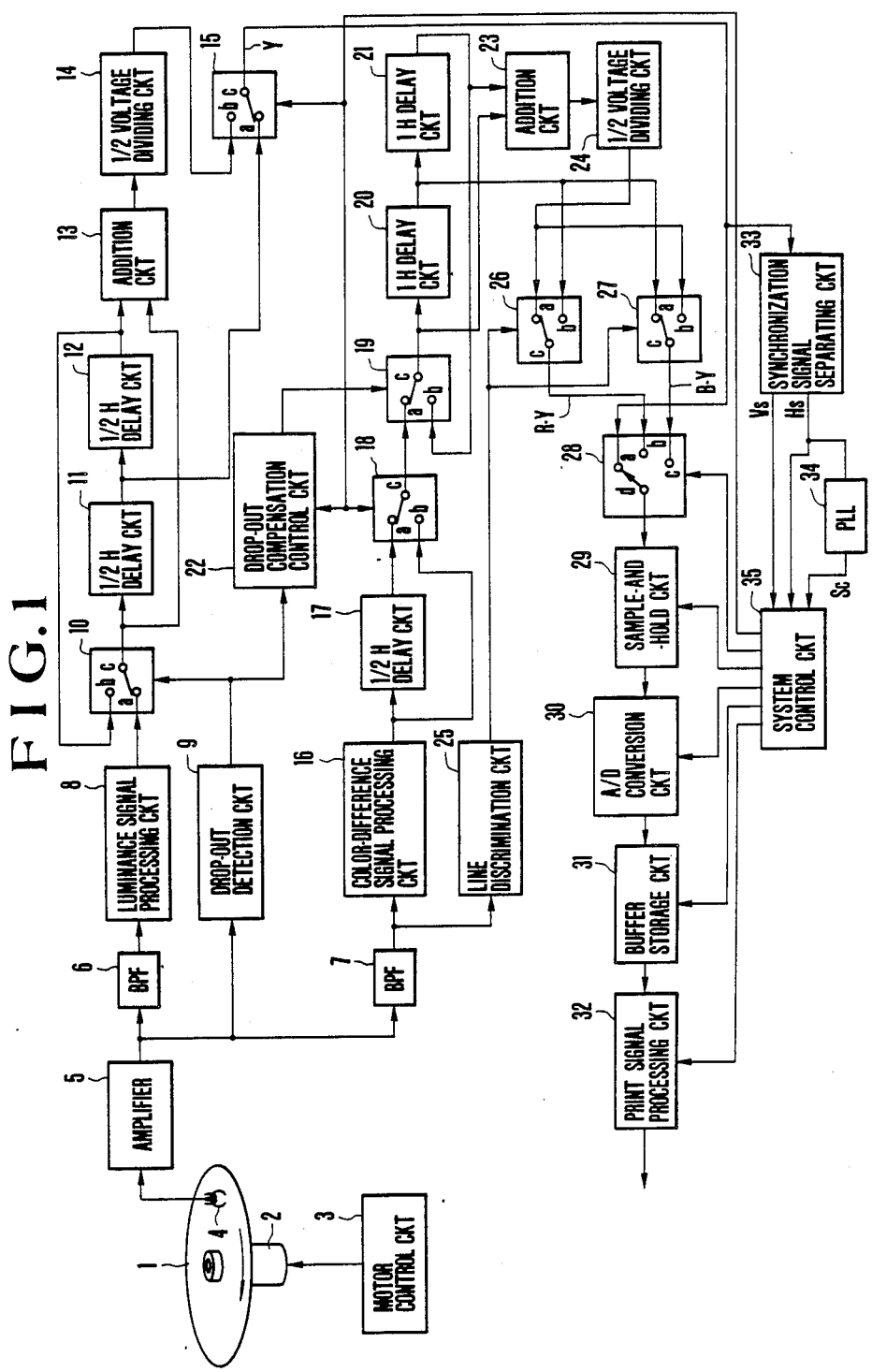

FIG. 3A
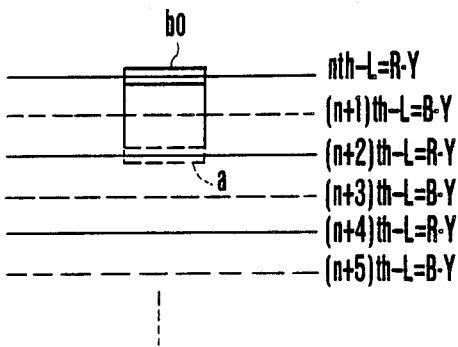
FIG. 3B
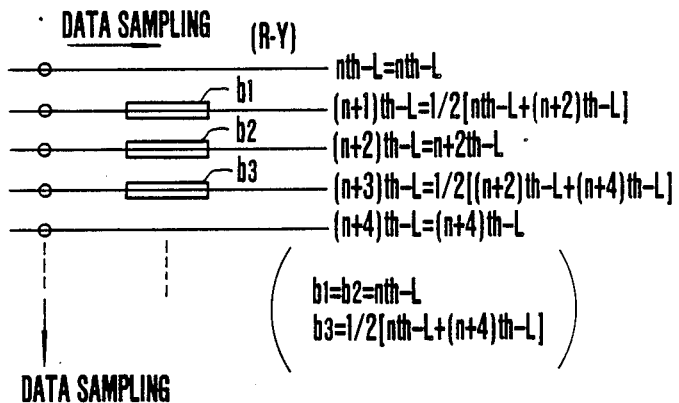
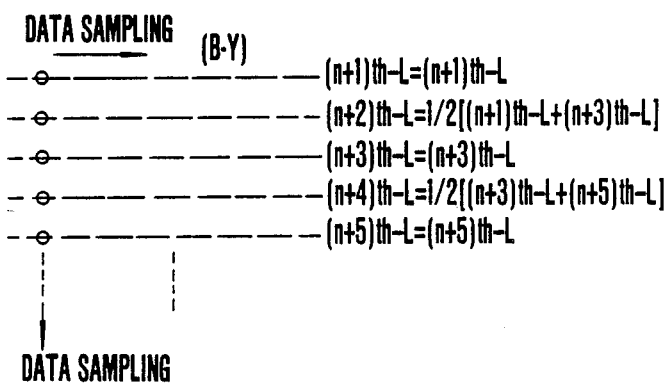

F I G. 4
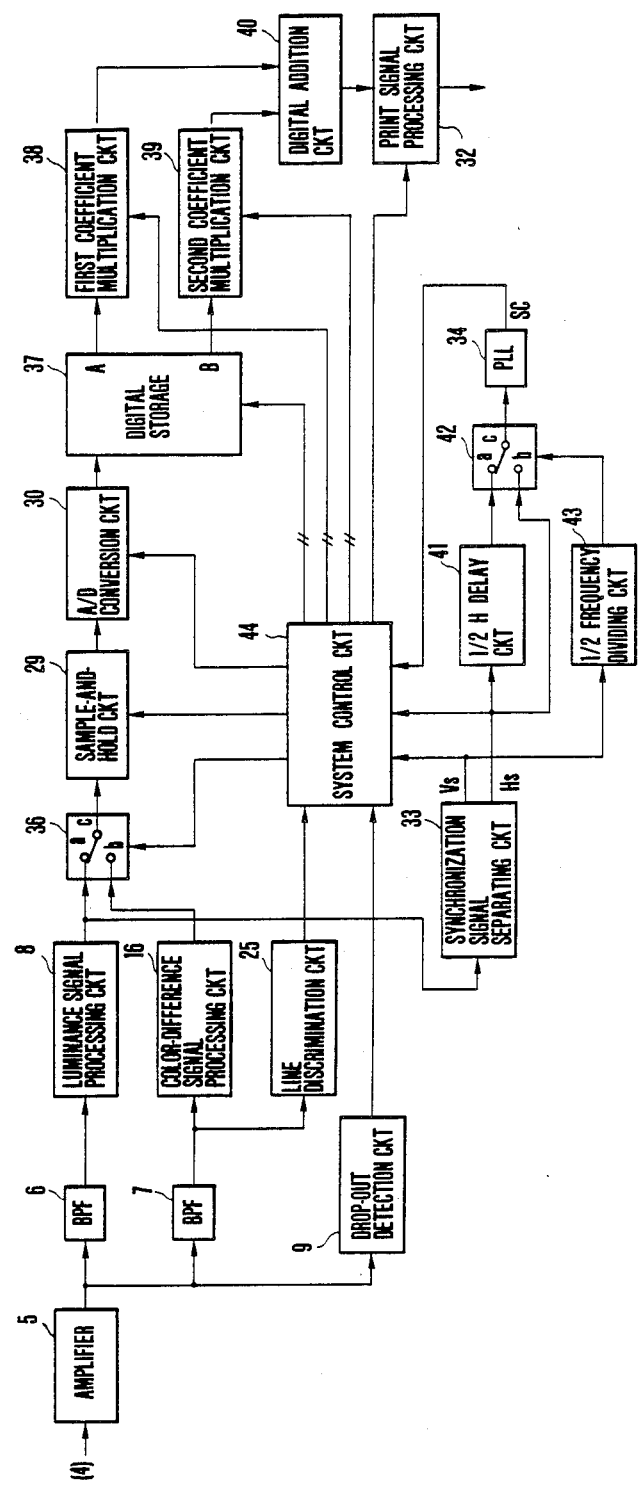

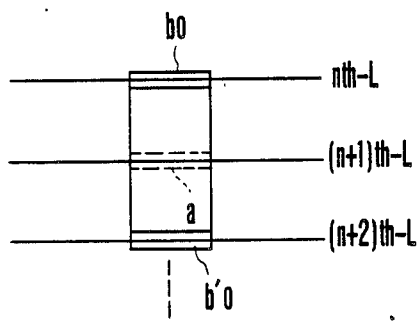

FIG.6A
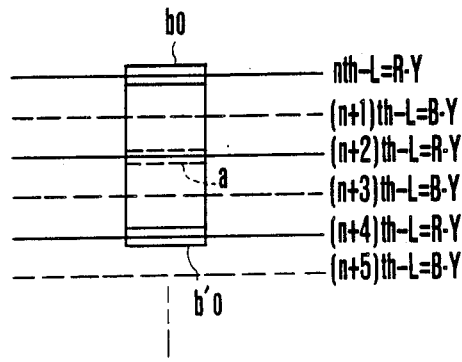
FIG.6B
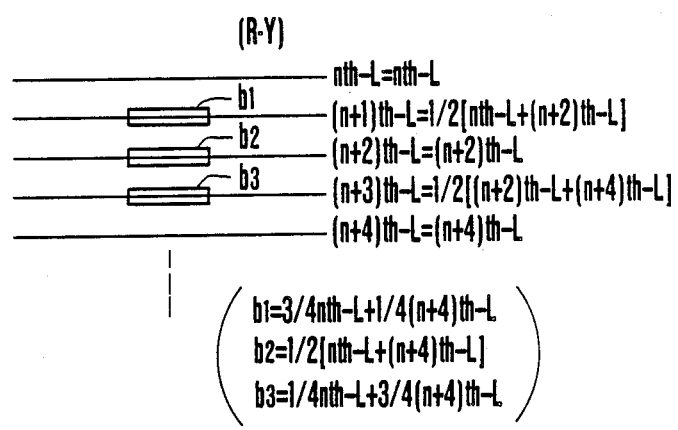
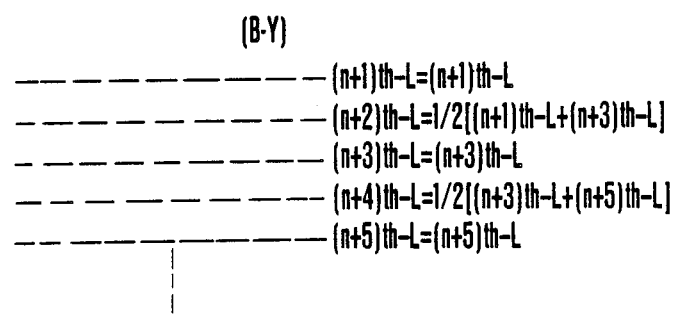

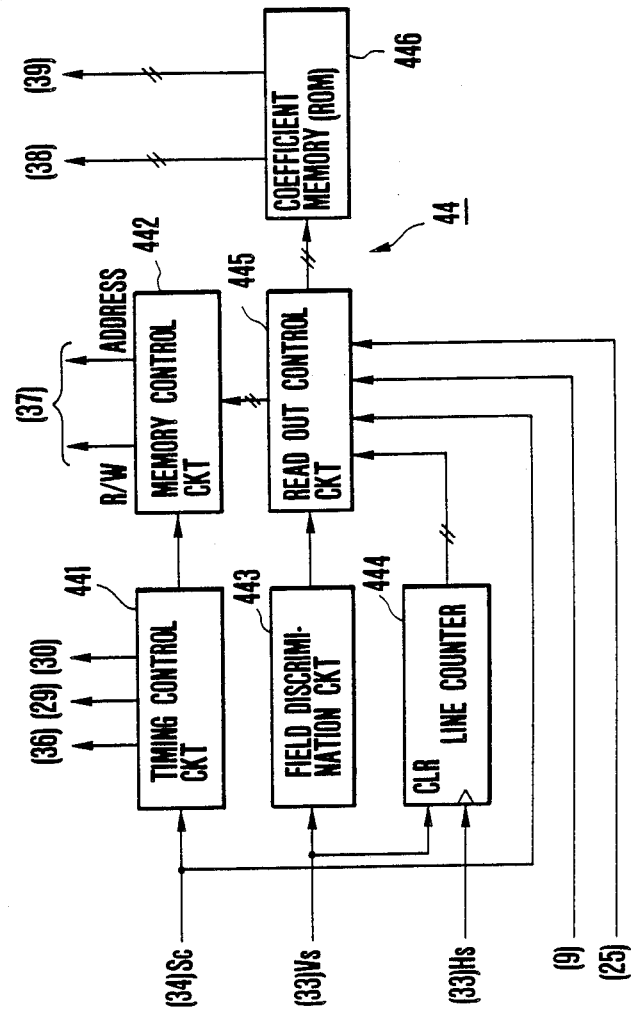

FIG. 9B (R-Y)

————————————— 1F·nth·L=nth·L
——————— b4 ———— 2F·nth·L=3/4nth·L+1/4(n+2)th·L
————————— b1 —— 1F·(n+1)th·L=1/2[nth·L+(n+2)th·L]
——————— b5 ———— 2F·(n+1)th·L=1/4nth·L+3/4(n+2)th·L
————————— b2 —— 1F·(n+2)th·L=(n+2)th·L
——————— b6 ———— 2F·(n+2)th·L=3/4(n+2)th·L+1/4(n+4)th·L
————————— b3 —— 1F·(n+3)th·L=1/2[(n+2)th·L+(n+4)th·L]
——————— b7 ———— 2F·(n+3)th·L=1/4(n+2)th·L+3/4(n+4)th·L
————————————— 1F·(n+4)th·L=(n+4)th·L $$\begin{pmatrix} b1=3/4nth\text{-}L+1/4(n+4)th\text{-}L \\ b2=1/2nth\text{-}L+1/2(n+4)th\text{-}L \\ b3=1/4nth\text{-}L+3/4(n+4)th\text{-}L \\ b4=7/8nth\text{-}L+1/8(n+4)th\text{-}L \\ b5=5/8nth\text{-}L+3/8(n+4)th\text{-}L \\ b6=3/8nth\text{-}L+5/8(n+4)th\text{-}L \\ b7=1/8nth\text{-}L+7/8(n+4)th\text{-}L \end{pmatrix}$$

(B-Y)

— — — — — — — — 1F·(n+1)th·L=(n+1)th·L
— — — · — — — · — 2F·(n+1)th·L=3/4(n+1)th·L+1/4(n+3)th·L
— — — — — — — — 1F·(n+2)th·L=1/2[(n+1)th·L+(n+3)th·L]
— — — · — — — · — 2F·(n+2)th·L=1/4(n+1)th·L+3/4(n+3)th·L
— — — — — — — — 1F·(n+3)th·L=(n+3)th·L
— — — · — — — · — 2F·(n+3)th·L=3/4(n+3)th·L+1/4(n+5)th·L
— — — — — — — — 1F·(n+4)th·L=1/2[(n+3)th·L+(n+5)th·L]
— — — · — — — · — 2F·(n+4)th·L=1/4(n+3)th·L+3/4(n+5)th·L
— — — — — — — — 1F·(n+5)th·L=(n+5)th·L

VIDEO SIGNAL PROCESSING SYSTEM

BACKGROUND OF THE INVENTION

1. Field of the Invention

This invention relates to a video signal processing system, and more particularly to a video signal processing system arranged to interpolate scanning lines and/or to compensate for a drop-out.

2. Description of the Prior Art

In processing a video signal, and particularly a reproduced video signal, it is necessary to have, as well known, some means for compensating defective parts of the signal which are called "drop-out". Further, in cases where a one frame portion of (two field portion) of a signal is to be simulatively obtained from one field portion of a signal in particular, it is necessary to carry out an operation called "scanning line interpolation".

In the case of a video print system, for example, it is hardly possible to print at real time, as a considerable length of time is required for printing one picture frame. Therefore, one picture portion of the input video signal is recorded or stored either in a record bearing medium such as a magnetic disc or the like or in a storage medium such as a semi-conductor memory or storage, and a printing operation is carried out by reproducing the recorded or stored signal. In such a case, drop-outs tend to occur in the reproduced signal thus obtained. In order to obtain an adequate printed picture, therefore, some means for compensating the drop-cuts becomes indispensable. Further, while a video print system is arranged to obtain a still picture, one frame signal is composed of two field portions of the signal which deviate one field period of time from each other. In order to obtain a printed picture without any blur, therefore, it is preferable to use only one field portion of the signal. However, in the event of only one field portion of signal, a picture of high quality is hardly obtainable because of a fewer number of scanning lines. In that case, therefore, the number of scanning lines must be increased by a scanning line interpolating operation.

A video signal processing system of that kind necessitates use of many delay circuits for scanning line interpolation and drop-out compensation. For these delay circuits, analog delay lines, such as glass lines, CCD delay lines, etc., are generally employed. However, these analog delay lines tend to cause signal deterioration and also changes in characteristic due to variations in ambient temperature. Further, with respect to the drop-out compensation, the quality of the picture tends to degrade in the compensated parts as each of the defective parts of the signal is merely replaced with a signal portion preceding it by an extent corresponding to one or several lines.

Further, the conventional arrangement for interpolating the scanning lines of a chrominance signal is capable of interpolating only for one field portion. However, an arrangement to increase this limited interpolation capability to a 2 or 3 field portion would necessitate use of a greater number of delay lines and would makes the above-stated problems more salient. Besides, such arrangement would result in an extremely complex processing system.

SUMMARY OF THE INVENTION

This invention is directed to the solution of the above-stated problems of the prior art. It is therefore a principal object of this invention to provide a novel video signal processing system capable of satisfactorily eliminating the shortcomings of the prior art systems in carrying out the signal scanning line interpolation and/or the drop-out compensation.

It is a more specific object of this invention to provide a novel video signal processing system which is capable of performing the scanning line interpolation and/or the drop-out compensation without causing any deterioration of the signal to be processed.

It is another object of this invention to provide a novel video signal processing system which is capable of performing highly elaborate scanning line interpolation and/or drop-out compensation despite a simple structural arrangement.

It is a further object of this invention to provide a novel video signal processing system which attains the above-stated objects by virtue of a digital processing arrangement.

Under these object, a video signal processing system embodying an aspect of this invention as a preferred embodiment thereof comprises: A/D converting means for analog-to-digital converting an input video signal; storing means for storing a data produced from the A/D converting means; coefficient multiplying means for multiplying the data stored at the storing means by coefficients; and control means for controlling the coefficients for the coefficient multiplying means in obtaining a scanning line interpolation signal and/or a drop-out compensating signal.

These and further objects, aspects and features of this invention will become apparent from the following detailed description of preferred embodiments thereof taken in connection with the accompanying drawings.

BRIEF DESCRIPTION OF THE DRAWINGS

FIG. 1 is a block diagram showing, by way of example, a video signal processing system which represents the arrangement of the prior art as the background of this invention.

FIGS. 3A and 3B are schematic illustrations showing the scanning line interpolation, the contemporization process and the drop-out compensating process performed on a color-difference signal in the processing system of FIG. 1.

FIG. 4 is a block diagram showing an embodiment of this invention in which the invention is applied to the video signal processing system shown in FIG. 1.

FIGS. 5A and 5B are schematic illustrations showing the scanning line interpolation process and the drop-out compensation process of the processing system of FIG. 4 as performed on a luminance signal.

FIGS. 6A and 6B are schematic illustrations showing the scanning line interpolation process, the contemporization process and the drop-out compensation process performed on a color difference signal by the processing system of FIG. 4.

FIG. 8 is a block diagram showing the arrangement of internal function blocks of a system control circuit included in the signal processing system of FIG. 4.

FIGS. 9A and 9B are schematic illustrations showing the scanning line interpolation, the contemporization process and the drop-out compensating process performed on a color-difference signal in a modification example of the system shown in FIG. 4.

DETAILED DESCRIPTION OF PREFERRED EMBODIMENTS

Figure 2A:
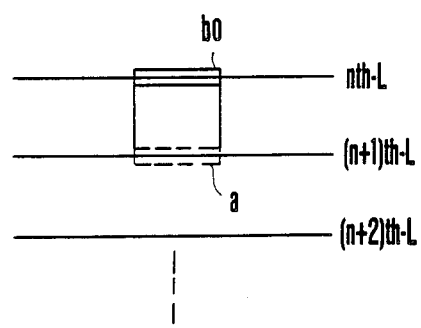
FIGS. 2A and 2B are schematic illustrations showing the scanning line interpolation and drop-out compensation processes carried out on a luminance signal by the video signal processing system shown in FIG. 1.

Before description of an embodiment of this invention, the video signal processing system of a video print system to which the present invention is applicable for improvement is described below with reference to FIG. 1.

Referring to FIG. 1, the video print system includes a magnetic disc 1 which is shown as an example of a record bearing medium. The disc 1 has recording tracks formed in a concentric manner. Each of the tracks has, for example, a one-field portion of a composite color video signal of the color-difference line-sequential type and frequency modulated with a luminance signal Y and color-difference signals R-Y and B-Y arranged to have different modulated frequencies. The magnetic disc 1 is arranged to be rotated by a motor 2. A motor control circuit 3 is arranged to control the motor 2 to have the disc 1 rotate at a speed corresponding to the field frequency, that is, to have the disc make exactly one revolution during one field period. The recorded signal in each recording track on the magnetic disc 1 is picked up by a reproducing magnetic head 4 and is then amplified by an amplifier 5. Synchronization signals and the luminance signal Y which are included in the output of the amplifier 5, are taken out by means of a band-pass filter (hereinafter referred to as BPF) 6 which has a passing frequency band corresponding to these signals. The color-difference signals R-Y and B-Y, which are also included in the output of the amplifier 5, are taken out by another BPF 7 which has a passing frequency band corresponding to them. The synchronization signals and the luminance signal Y, which are thus taken out through the BPF 6, are supplied to a luminance signal reproduction processing circuit 8 which includes a demodulation circuit, etc. The output of the processing circuit 8 is applied to one input terminal "a" of a luminance signal drop-out compensating switching circuit 10. The output "c" of the switching circuit 10 is arranged to be fed back to the other input terminal "b" of the circuit 10 via two ½ horizontal period delay circuits 11 and 12 (hereinafter the horizontal period will be called H for short) which are series connected to the output terminal "c" of the switching circuit 10. Normally, the output terminal "c" of the circuit 10 is in connection with the input terminal "a". In the event of a drop-out in the signal, however, the output of a drop-out detection circuit 9, which is arranged to detect a partial drop-out of the signal produced from the amplifier 5, controls the circuit 10 in such a way as to have the connection of the output terminal "c" shifted from the input terminal "a" to the other input terminal "b" for a period substantially corresponding to the period of the drop-out. In the event of a drop-out, therefore, the drop-out part of the signal is substantially replaced with a portion of the luminance signal which is obtained one horizontal period (H) before the drop-out through the ½ H delay circuits 11 and 12.

Meanwhile, the output "c" of the switching circrcuit 10 is supplied to an addition circuit 13 together with the output of the ½ H delay circuit 12. The output of the addition circuit 13 is supplied to a ½ voltage dividing circuit 14. As a result of this, the ½ voltage dividing circuit 14 produces a signal of a level which is ½ of the level of an addition signal produced by the addition circuit 13 by adding up two lines, that is, a line interpolated luminance signal in the vertical direction is produced from the circuit 14.

The output of the ½ H delay circuit 11 and that of the ½ voltage dividing circuit 14 are supplied to the input terminals "a" and "b" of a switching circuit 15 which is arranged for skew-compensating the luminance and synchronization signals, respectively. The switching circuit 15 is under the control of the field change-over control signal of a system control circuit 35 and is arranged to have its output terminal "c" alternately connected to its input terminals "a" and "b" for every field. In other words, the switching circuit 15 produces a skew-compensated simulation frame luminance signal and synchronization signals for one field portion of the video signal recorded in one recording track on the disc 1.

The color-difference signals R-Y and B-Y, which are taken out by means of the BPF 7, are supplied to a color-difference signal reproduction processing circuit 16, which includes a demodulation circuit, etc., and also to a line discrimination circuit 25. The output of the processing circuit, etc. and also to a line discrimination circuit 25. The output of the processing circuit 16 is supplied directly to one input terminal "b" of the color-difference skew-compensating switching circuit 18 and indirectly to the other input terminal "a" thereof through a ½ H delay circuit 17. The switching circuit 18 is also caused, by the field changeover control signal of the system control circuit 35, to have the output terminal "c" thereof connected alternately to the input terminals "a" and "b" thereof for every field in the same manner as the input switching operation of the above-stated switching circuit 15 which is provided for skew compensation of the luminance and synchronization signals. The switching circuit 18 thus produces color-difference signals R-Y and B-Y which have been skew-compensated.

The output "c" of the switching circuit 18 is supplied to one input terminal "a" of a color-difference drop-out compensating switching circuit 19. The output "c" of the switching circuit 19 is fed back to the other input terminal "b" of the switching circuit 19 via two 1 H delay circuits 20 and 21 which are connected in series. This switching circuit 19 is under the control of a color-difference signal drop-out compensating control circuit 22 which is responsive to the field change-over control signal produced from the system control circuit 35 and also to the detection output of the above-stated drop-out detection circuit 9. More specifically, the output terminal "c" of the switching circuit 19 is caused to be in connection with the input terminal "a" thereof by the drop-out compensating control circuit 22 when no drop-out is detected from the signal. However, when a partial drop-out is detected from the signal while the switching circuit 18 is in connection with the input terminal "a" thereof, the drop-out compensating control circuit 22 causes the output terminal "c" of the switching circuit 19 to be connected to the input terminal "b" thereof for a period substantially corresponding to a period during which the drop-out is detected in the signal of the applicable line. In the event that a partial drop-out of the signal is detected while the switching circuit 18 is in connection with the other input terminal "b" thereof, the drop-out compensating control circuit 22 causes the switching circuit 19 to be in connection with the input terminal "b" for a period which substantially corresponds to a period delayed by ½ H from the period of the detection.

The output of the switching circuit 19 is applied to an addition circuit 23 together with the output of the 1 H delay circuit 21. The output of the addition circuit 23 is arranged to have its level reduced to ½ by a ½ voltage dividing circuit 24 and to be thus made into a line interpolated color-difference signal. The line interpolating color-difference signal thus obtained is then supplied to an input terminal "a" of a color-difference signal contemporization switching circuit 26 and also to an input terminal "b" of another color-difference signal contemporization switching circuit 27. Meanwhile, the output of the 1 H delay circuit 20 is supplied to other input terminals "b" and "a" of the switching circuits 26 and 27, respectively. The output of a line discrimination circuit 25 controls each of these switching circuits 26 and 27 in such a manner that the connection of its output terminal "c" is switched between the input terminals "a" and "b" for every line (or every color-difference signal). This causes the switching circuits 26 and 27 to simultaneously produce color-difference signals R-Y and B-Y which are respectively made continuous by line interpolation.

A signal selection switching circuit 28 has input terminals "a", "b" and "c" respectively arranged to receive the synchronization signals and luminance signal Y, the color-difference signal R-Y and the color-difference signal B-Y produced from the above-stated switching circuits 15, 26 and 27, respectively. The input signal selecting operation of the switching circuit 28 is under the control of a control signal which is produced from a system control circuit 35. The selected signal output "d" of the signal selection switching circuit 28 is sampled and held by a sample-and-hold circuit 29 under the control of the system control circuit 35. The output of the sample-and-hold circuit 29 is analog-to-digital converted by an A/D conversion circuit 30. The digital output thus obtained from the circuit 30 is stored at a buffer storage circuit 31. The stored data of the storage circuit 31 is applied to a print signal processing circuit 32 to be converted into a suitable print signal or the like. The print signal thus obtained is applied to a print head in a printer which is not shown. The A/D conversion circuit 30, the buffer storage circuit 31 and the print signal processing circuit 32 are all under the control of the system control circuit 35.

The synchronization signal and the luminance signal Y produced from the above-stated switching circuit 15 are supplied also to a synchronization signal separating circuit 33. Horizontal and vertical synchronization signals Hs and Vs are taken out by this circuit 33 and are supplied to the system control circuit 35. A phase-locked loop 34 (hereinafter referred to as PLL) receives the horizontal synchronization signal Hs and forms a data sampling timing signal Sc which is in synchronism with the signal Hs. The timing signal Sc is supplied to the system control circuit 35.

Figure 2B:
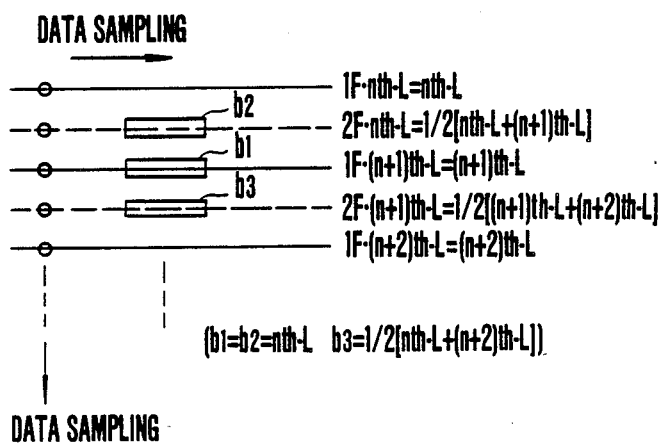

With the video signal processing system arranged in the manner as described above, the main signal processing functions, particularly including scanning line interpolation, color-difference signal contemporization process and drop-out compensation, etc., are as described below:

With regard to the scanning line interpolation for the luminance signal Y, FIG. 2A shows non-interpolated scanning line luminance signals of nth−L, (n+1)th−L, (n+2)th−L,—(wherein L represents a scanning line). FIG. 2B shows interpolated scanning line luminance signals. As shown in FIG. 2B, for a first field, the scanning line luminance signals of nth−L, (n+1)th−L, (n+2)th−L,—in FIG. 2A are produced as indicated by full lines in FIG. 2B. For a second field, signals of a level which is ½ of the sum of two vertically adjacent scanning line luminance signals are produced including ½{(nth−L)+(n+1)th−L}, ½{(n+1)th−L+(n+2)th−L},—as indicated by broken lines in FIG. 2B. By this, a simulative frame luminance signal is obtained through scanning line interpolation. In FIG. 2B, reference symbols 1F and 2F respectively denote the first and second fields.

The drop-out compensating operation of the signal processing system is as follows: Assuming that a drop-out "a" arises in the signal of (n+1)th−L in FIG. 2A, this drop-out part "a" is replaced with a signal portion which substantially corresponds to a signal portion preceding the drop-out part by 1 H. In other words, the drop-out part is replaced with a substantially corresponding part "bo" of the signal of nth−L. After the interpolation, the corresponding parts "b1" and "b2" of signals of 1F (n+1)th−L and 2F nth−L both changed to "b0" that is nth-L as shown in FIG. 2B. Further, the corresponding part "b3" of the signal of 2F (n+1)th−L becomes a signal which can be expressed as ½{nth−L+(n+2)th−L}.

The scanning line interpolation and contemporization process on color-difference signals are as shown in FIGS. 3A and 3B. In FIG. 3A, full lines represent the line-sequential color-difference signal R-Y while broken lines represent the line-sequential color-difference signal B-Y. In the case of FIG. 3B, the signal R-Y has the signal portions of nth−L, (n+2)th−L, (n+4)th−L,— produced in the same manner as in FIG. 3A. Meanwhile the portions which are between them and corresponding to the signal B-Y including portions of (n+1)th−L, (n+3)th−L,—are interpolated, respectively, with portions ½{(nth−L+(n+2)th−L}, ½{(n+2)th−L+(n+4)th−L},—to obtain one field portion of the signal R-Y. The signal B-Y likewise has the signal portions of (n+1)th−L, (n+3)th−L, (n+5)th−L,—produced in the same state as in FIG. 3A. Meanwhile, the portions which are between them and corresponding to the signal R-Y including portions of (n+2)th−L, (n+4)th−L,—are interpolated, respectively, with ½{(n+1)th−L+(n+3)th−L}, ½{(n+3)th−L+(n+5)th−L},—to obtain one field portion of the signal B-Y through interpolation. These color-difference signals are of course simultaneously produced through contemporization process.

Further, the drop-out compensating operation is as follows: Assuming that a drop-out arises at a part "a" in the portion of (n+2)th−L of the signal R-Y, this part is replaced with a part corresponding to a part preceding by 2H, i.e. with a corresponding part "bo" of the portion of nth−L of the signal R-Y. In the signal R-Y after the interpolation and the contemporization process as shown in FIG. 3B, the applicable parts "b1" and "b2" in the portions of (n+1)th−L and (n+2)th−L both become "b0", that is, become the portion of nth−L of the signal R-Y. Further, an applicable part "b3" in the portion of (n+3)th−L of the signal R-Y becomes a portion of ½{nth−L+(n+4)th−L} of the signal R-Y.

As for the data sampling operation for obtaining the print signal, the sample-and-hold circuit 29 is controlled by the system control circuit 35 on the basis of a timing signal Sc, etc. and the data sampling operations are accomplished, in the vertical direction at points indicated by circles in the line luminance signal Y of FIG. 2B and in the contemporized line color-difference signals R-Y and B-Y of FIG. 3B. The sampling operations are repeated at predetermined intervals in the horizontal direction.

In the example of a video signal processing system described, many delay circuits 11, 12, 17, 20 and 21 are used for the scanning line interpolation and drop-out compensation of the luminance signal, the scanning interpolation, the contemporization process, the drop-out compensation and the skew compensation of the color-difference signals, etc. Generally, analog delay lines such as glass delay lines, CCD delay lines, etc. are used for such delay circuits. However, such analog delay lines tend to degrade signals and also tend to have their characteristics affected by changes in ambient temperature.

Further, with respect to the drop-out compensation, the drop-out part of the luminance signal is simply arranged to be replaced with a signal part preceding it by 1 H (one line). In the case of the color-difference signal, the drop-out part is simply replaced with a signal part preceding by 2 H (2 lines). Therefore, the picture quality at the compensated part has been prone to deterioration.

Another disadvantage of the prior art system described resides in that: The system is incapable of interpolating more than one field portion of the color-difference signal. In order to increase the interpolation capability up to a two- or three-field portion of the signal, the arrangement of the system necessitates an increase in the number of the delay circuits to further complicate the already complex arrangement of the processing system. Then, such attempt would make the problems mentioned in the foregoing more serious.

A video signal processing system embodying this invention as a preferred embodiment thereof is arranged as shown in FIG. 4. In FIG. 4, the same reference numerals as those of FIG. 1 are used for denoting components of the same arrangement and functions as those of the corresponding ones shown in FIG. 1. Further, in FIG. 4, the magnetic disc 1, the motor 2, the motor control circuit 3 and the magnetic head 4 are omitted from the illustration, which is limited to the arrangement of the amplifier 5 and ensuing components.

In the case of this embodiment, the outputs of the luminance signal reproduction processing circuit 8 and the color-difference signal reproduction processing circuit 16 are arranged to be supplied to the input terminals "a" and "b" of a signal selection switching circuit 36, respectively. The switching circuit 36 is controlled by a system control circuit 44. The output "c" selected by the switching circuit 36 is arranged to be sampled and held by a sample-and-hold circuit 29 which is also under the control of the system control circuit 44. The output of the sample-and-hold circuit 29 is A/D converted by an A/D conversion circuit 30 and, after that, is stored in a digital store 37 (such as a RAM) under the conrol of the system control circuit 44. The system control circuit 44 controls the data sampling operation of the sample-and-hold circuit 29 to cause it to be performed in the vertical direction in the same manner as has been described with reference to FIGS. 2B and 3B. Then, the control circuit 44 controls the digital store 37 to cause it to store the A/D converted data obtained for a predetermined number of sampling points. The two outputs A and B of the storage 37 are applied, respectively, to first and second digital coefficient multiplication circuits 38 and 39. At the multiplication circuits 38 and 39, the outputs A and B are multiplied by predetermined coefficients which are respectively under the control of the system control circuit 44. The multiplied outputs are added up at a digital addition circuit 40. The output of the addition circuit 40 is then supplied to a print signal processing circuit 32.

In this embodiment, the output of a drop-out detection circuit 9 and that of the line discrimination circuit 25 are arranged to be supplied to the system control circuit 44 together with horizontal and vertical synchronization signals Hs and Vs produced from the synchronization signal separating circuit 33. The horizontal synchronization signal Hs is supplied directly to the input terminal "b" of a skew compensating switching circuit 42 which is under the control of the output of a ½ frequency dividing circuit 43. This circuit 43 is arranged to divide the frequency of the vertical synchronization signal Vs by ½. Further, the horizontal synchronization signal Hs is also supplied to the other input terminal "a" of the switching circuit 42 via a ½ H delay circuit 41. The output "c" of the switching circuit is supplied to the PLL 34. The output of the PLL 34 is supplied to the system control circuit 44 as a sampling timing signal.

Figure 7:
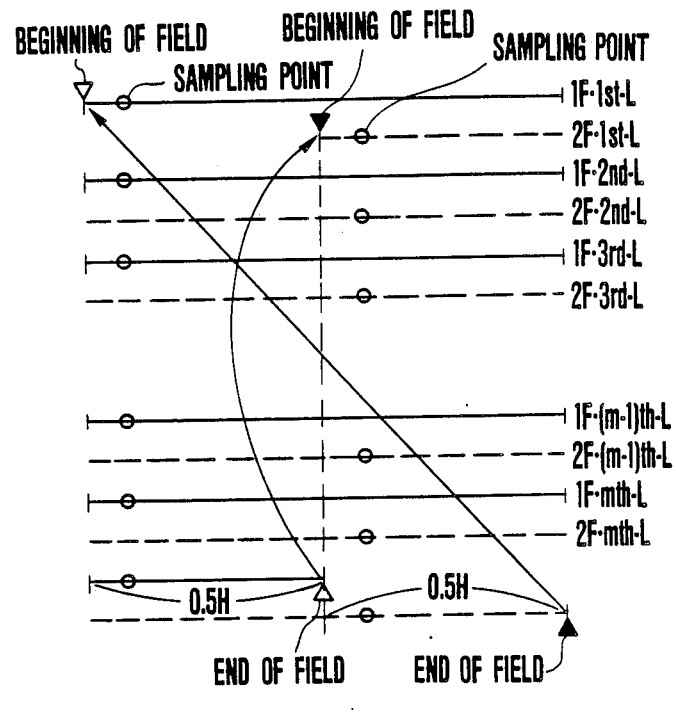
FIG. 7 is a schematic illustration of data sampling points for obtaining a printing signal in the processing system of FIG. 4 and a modification example thereof.

With the signal processing system arranged as described above, the scanning line interpolating operation of the system on the luminance signal Y is as follows: In processing the luminance signal Y, the system control circuit 44, at the first field, has the coefficients which are to be used for multiplication by the first and second coefficient multiplication circuits 38 and 39 respectively set at "1" and "0". At the same time, the system control circuit 44 causes the store 37 to produce from its output terminal A the stored A/D converted sample data one after another in the sequence of lines. At the second field, the system control circuit 44 changes both the coefficients for the first and second multiplication circuits 38 and 39 to "½". At the same time, the system control circuit 44 causes the store 37 to have the A/D converted sample data of mutually adjacent odd and even number lines simultaneously produced from the output terminals A and B. As a result of this, the relation of a simulative frame luminance signal obtained by the scanning line interpolation to the one-field portion of the luminance signal becomes as shown in FIGS. 5A and 5B, FIG. 5A showing the signal in a non-interpolated signal and FIG. 5B showing the interpolated signal. The illustrations are arranged in the same manner as those of FIGS. 2A and 2B. In FIG. 5B, the A/D converted sample data, which is in a state of having been skew compensated on the basis of the sampling timing signal from the PLL 34, is schematically shown in horizontal lines for the sake of simplification of illustration. In actuality, however, the sample data is dispersed also in the horizontal direction. The same comments apply also to FIGS. 6B and 9B which will be referred to later herein. In the case of the prior art example shown in FIG. 1, the data sampling operation is performed after skew compensation has been performed on the luminance and color-difference signals. Whereas, in the case of this embodiment, no skew compensation is performed on the luminance and color-difference signals. Instead of it, the sampling timing signal, which is produced from the PLL 34, is arranged to be skew-compensated by circuit means composed of a ½ H delay circuit 41, a switching circuit 42 and a ½ frequency dividing circuit 43, so that skew compensation can be accomplished at the time of data sampling. In this embodiment, the relation of the frame signal to the data sampling points is as shown in FIG. 7. In FIG. 7, full lines represent odd number fields and broken lines, even number fields, respectively. The marks "o" or circles on these lines represent data sampling points.

In the event of an occurrence of a partial dropout in one line of the input video signal, a total of four lines including this line with the drop-out and also the preceding and ensuing interpolation lines are affected by the drop-out in the case of the prior art system as described in the foregoing with reference to FIGS. 2A and 2B. In the case of this embodiment, the system control circuit 44 causes, in response to the output of the drop-out detection circuit 9, the digital store 37 to produce the data of lines preceding and ensuing the line having the drop-out from the output terminals A and B thereof; for the first field, the circuit 44 causes the coefficients for both the first and second multiplication circuits 38 and 39 to be "½" during the drop-out period; and, for the second field, the circuit 44 causes the coefficients for the first and second multiplication circuits 38 and 39 to become "¾" and "¼", respectively, for the preceding interpolation line and to become "¼" and "¾", respectively, for the ensuing interpolation line during the drop-out period. For example, with a drop-out assumed to have occurred at a part "a" in a portion or line (n+1)th−L of the signal as shown in FIG. 5A, the corresponding parts "b0" and "b'0" of preceding and ensuing lines nth−L and (n+2)th−L are appropriated to the drop-out part in the manner as mentioned in the foregoing. As a result, the corresponding part "b1" of a line 1F·(n+1)th−L is replaced with ½ "b0"+½ "b'0", i.e. ½ nth−L+½ (nthth−L, as shown in FIG. 5B. The corresponding part "b2" of a line 2F·nth−L is replaced with ¾ "b0"+¼ "b'0", i.e. ¾ nth−L+¼ (n+2)th−L. Then, a line 2F·(n+1)th−L is replaced with ¼ "b0"+¾ "b'0", i.e. ¼ nth−L+¾ (n+2)th−L. The drop-out compensation is accomplished in this manner.

Next, scanning line interpolation for color-difference signals R-Y and B-Y is as follows: In processing the color-difference signal R-Y, the system control circuit 44 causes the store 37 to simultaneously produce, from the output terminals A and B thereof, the A/D converted sample data of mutually adjacent lines of the signal R-Y (odd number lines, for example). Then, during one output period of this, the system control circuit 44 causes the coefficients for the first and second multiplication circuits 38 and 39 to be shifted in such a manner as: ["1" and "0"]→["½" and "½"]→["0" and "1"]. In processing the color-difference signal B-Y, the store 37 is caused to simultaneously produce, from the output terminals A and B, the A/D converted sample data of mutually adjacent lines of the signal B-Y (even number lines, for example). Then, during one output period of this, the control circuit 44 controls the coefficients for the first and second multiplication circuits 38 and 39 to shift them in the same manner as mentioned above. As a result, a simulative field continuous R-Y signal and a simulative field continuous B-Y signal are obtained by interpolating the one-field portion of the line-sequential color-difference signal R-Y and B-Y. The interrelation of them is as shown in FIGS. 6A and 6B. FIG. 6A shows the signals before interpolation. FIG. 6B shows the signals after interpolation. These illustrations are arranged in the same manner as FIGS. 3A and 3B. Although, in FIG. 6B, the signals R-Y and B-Y are schematically shown in lines for the sake of simplification of illustration, they are A/D converted sample data and, in actuality, are dispersive also in the horizontal direction.

In the event that a partial drop-out takes place in the input video signal during the processing operation on the above-stated color-difference signal R-Y or B-Y, the system control circuit 44 responds to the output of the drop-out detection circuit 9 to cause the store 37 to produce, from the output terminals A and B, the data of lines of the same color-difference signal preceding and ensuing the color-difference signal line having the drop-out. In other words, the data of lines obtained 2H before and 2H after the line in question. Then, for an interpolation line 1H before the drop-out line, the coefficients for the first and second multiplication circuits 38 and 39 are respectively shifted to "¾" and "¼" during a period corresponding to the drop-out. For the drop-out line, both the coefficients are shifted to "½". For an interpolation line 1H after the drop-out line, the coefficients are shifted respectively to "¼" and "¾". An example of this control operation is as shown in FIG. 6A. In this case, a drop-out is assumed to have occurred at a part "a" of the line (n+2)th−L of the signal R-Y. To this drop-out part "a" is appropriated a combination of the corresponding parts "b0" and "b'0" of lines nth−L and (n+4)th−L obtained 2H before and 2H after the drop-out line. As a result of this, as shown in FIG. 6B, the corresponding part "b1" of the line (n+1)th−L of the signal R-Y is replaced with the ¾ "b0"+¼ "b'0", i.e. ¾ nth−L+¼ (n+4)th−L, of the signal R-Y; the corresponding part "b2" of the line (n+2)th−L of the signal R-Y is replaced with ½ "b0"+½ "b'0", i.e. ½ nth−L+½ (n+4)th−L, of the signal R-Y; and the corresponding part "b3" of the line (n+3)th−L of the signal R-Y is replaced with ¼ "b0"+¾ "b'0" i.e. ¼ nth−L+¾ (n+4)th−L of the signal R-Y. The drop-out compensation is accomplished in this manner.

The system control circuit 44 may be composed of, for example, a micro-computer (CPU) or the like. In that instance, the internal function blocks are arranged as shown in FIG. 8. Referring to FIG. 8, the internal arrangement includes a sampling timing control circuit 441 which is arranged to operate in response to the sampling timing signal Sc produced from the PLL 34 so that the sampling operation on the luminance signal Y and the color-difference signals R-Y and B-Y and the A/D conversion are accomplished at a timing as shown in FIG. 7 with the switching circuit 36, the sample-and-hold circuit 29 and the A/D conversion circuit 30. A storage control circuit 442 operates in response to a timing signal from the sampling timing control circuit 441 and is arranged to control data writing and data reading to and from the store 37. More specifically, the data produced from the A/D conversion circuit 30 is written into the store 37 in response to the timing signal from the sampling timing control circuit 441, and the data of the store 37 is read out under the control which is based on an output of a readout control circuit 445.

A field discrimination circuit 443 is arranged to discriminate a first and second fields from each other on the basis of a vertical synchronization signal Vs produced from the synchronization signal separating circuit 33. A line counter 444 is arranged to count the horizontal synchronization signal Hs from the synchronization signal separating circuit 33. The count value of the counter 444 is cleared by the vertical synchronization signal Vs. The readout control circuit 445 is is arranged to control the storage control circuit 442 by designating a data to be read out from the storage 37 according to the outputs of the field discrimination circuit 443, the line counter 444, the PLL 34, the drop-out detection circuit 9 and the line discrimination circuit 442. The readout control circuit 445 is further arranged to control coefficients produced from a coefficient storage (such as a ROM) 446 which stores the coefficients to be applied to the first and second coefficient multiplication circuits 38 and 39.

The storage control circuit 442 is arranged to control the store 37 in the following manner: In writing the data into the store 37, the sampled data which are sampled from the luminance signal Y and the color-difference signals R-Y and B-Y and are A/D converted, are written in at respective store locations within the storage 37; and, in reading the data, the data are read out according to the designation made by the readout control circuit 445. The readout control circuit 445 is arranged to designate the data to be read out in such a way as to have the scanning line interpolation and the drop-out compensation carried out in the manner as described in the foregoing for each of the luminance signal Y and the color-difference signals R-Y and B-Y, respectively.

While the embodiment of the invention is arranged as described above, a modification of the embodiment is arranged as described below:

In the embodiment described, for each of the color-difference signals R-Y and B-Y, the scanning line interpolation is arranged to obtain one field portion of the signal in the same manner as in the case of FIG. 1. However, this arrangement may be changed to obtain one frame portion of each of the signals R-Y and B-Y in the same manner as in the case of the luminance signal Y by increasing the number of the interpolation lines. In this instance, the system control circuit 44 controls, for the first field, the store 37 and the coefficients for the first and second multiplication circuits 38 and 39 in exactly the same manner as the manner described in the foregoing in processing the signals R-Y and B-Y. The drop-out compensation is also controlled in exactly the same manner. Whereas, for the second field, the system control circuit 44 controls the coefficients for the first and second multiplication circuits 38 and 39 to be ("$\frac{3}{4}$" and "$\frac{1}{4}$") — ("$\frac{1}{4}$" and "$\frac{3}{4}$") within one output period of the store 37 in processing the signals R-Y and B-Y. During this process, if a partial drop-out arises in the input video signal, the system control circuit 44 performs control in the following manner: The coefficients for the first and second multiplication circuits 38 and 39 are changed, respectively, to be "$\frac{7}{8}$" and "$\frac{1}{8}$", during a period corresponding to the drop-out, for a second field line preceding an interpolation line which is 1H before the drop-out line in the first field. The coefficients are changed, respectively, to be "$\frac{5}{8}$" and "$\frac{3}{8}$", during the period corresponding to the drop-out, for another second field line located between the drop-out line and the interpolation line 1H before the drop-out line in the first field. The coefficients are changed to be "$\frac{3}{8}$" and "$\frac{5}{8}$", during the period corresponding to the drop-out, for a second field line located between the drop-out line and an interpolation line 1H after the drop-out line in the first field. The coefficients are changed to be "$\frac{1}{8}$" and "$\frac{7}{8}$", during the period corresponding to the drop-out, for a second field line which follows the interpolation line 1H after the drop-out line in the first field.

Figure 9A:
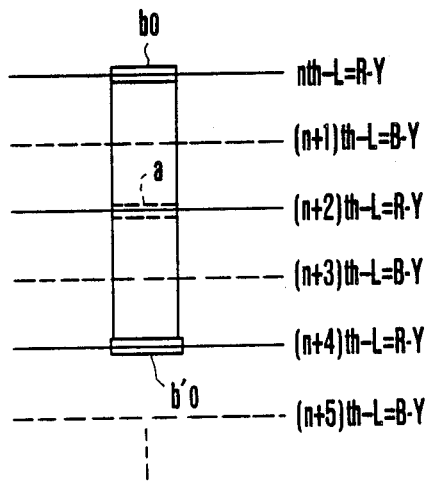

FIGS. 9A and 9B show the simulative frame continuous R-Y and B-Y signals thus obtained through the above-stated interpolation in relation to the one-field portion of the line-sequential color-difference signals R-Y and B-Y. Fig. 9A shows the signals before interpolation and FIG. 9B the signals after interpolation in the same manner as in FIGS. 6A and 6B. Further, in FIG. 9B, full lines indicate the R-Y signal in the first field; one-dot-chain lines indicate the R-Y signal in the second field; broken lines indicate the B-Y signal in the first field; and two-dot-chain lines indicate the B-Y signal in second field. In case that a drop-out arises at a part "a" of a line (n+2)th—L of the non-interpolated signal R-Y as shown in FIG. 9A, the drop-out compensation for the signal R-Y is accomplished in exactly the same manner as in the case of FIGS. 6A and 6B for the first field. For the second field, however, the drop-out corresponding part "b4" in the line 2F nth—L of the signal R-Y is replaced with a line $\frac{7}{8}$ "b0"+$\frac{1}{8}$ "b'0", i.e. $\frac{7}{8}$ nth—L+$\frac{1}{8}$(n+4)th—L, of the signal R-Y; the drop-out corresponding part "b5" of a line 2F·(n+1)th—L of the signal R-Y is replaced with $\frac{5}{8}$ "b0"+$\frac{3}{8}$ "b'0", i.e. $\frac{5}{8}$ nth—L+$\frac{3}{8}$ (n+4)th—L, of the signal R-Y; the drop-out corresponding part "b6" of a line 2F (n+2)th—L of the signal R-Y is replaced with $\frac{3}{8}$ "b0"+$\frac{5}{8}$ "b'0", i.e. $\frac{3}{8}$ nth—L+$\frac{5}{8}$ (n+4)th—L of the signal R-Y; and the drop-out corresponding part "b7" of a line 2F (n+3)th—L of the signal R-Y is replaced with $\frac{1}{8}$ "b0"+$\frac{7}{8}$ "b'0", i.e. $\frac{1}{8}$ nth—L+$\frac{7}{8}$ nth—L of the signal R-Y, respectively.

In accordance with the arrangement of this modification example given above, the scanning line interpolation can be more elaborately carried out for color-difference signal without complicating the arrangement of the processing system, so that the color reproducibility of the printer can be enhanced.

In the embodiment of this invention including the modification example given above, almost or substantially no analog delay line is used for the video signal processing system. Therefore, the signal is never deteriorated by the processing operation. Further, with respect to the drop-out compensation, the compensation is carried out with a medium signal according to the position of each line. This ensures that the picture quality never is degraded.

In the case of the embodiment described, this invention is applied to a color video signal processing system for a video color printer. However, the applicability of the invention is of course not limited to the signal processing system of such a printer. The invention is applicable to various kinds of video signal handling apparatuses and is advantageous particularly for an apparatus handling digital video signals. As for the signals to be processed, the signals are not limited to color video signals of the color-difference line-sequential type but also include color video signals of other types. Further, even non-color or black-and-white video signals also can be handled. Further, the embodiment described is arranged to perform both the scanning line interpolation and drop-out compensation. However, in accordance with the invention, either one of them may be arranged to be singly performed.

A video signal processing system embodying one aspect of thus invention, as described in detail in the foregoing, is capable of satisfactorily carrying out scanning line interpolation and/or drop-out compensation more elaborately than prior art systems despite of simple arrangement thereof. Therefore, the system according to this invention is highly advantageous.

Further, another aspect of this invention resides in the arrangement for skew compensation as indicated by elements 41–43 and 34 in FIG. 4. According to this arrangement, the timing for data sampling is determined in such a way as to effect skew compensation thereby. This arrangement obviates the necessity of providing delay circuits (such as the ½ H delay circuits 11 and 17 of FIG. 1) in the video signal channel for the purpose of skew compensation. This arrangement is also highly advantageous as it serves to further prevent the video signal from being degraded during the processing operation.

The signal interpolation method of this invention is applicable not only to scanning line interpolation but also to data interpolation to be accomplished among sampled on one and the same scanning line. More specifically, the sampled data of one scanning line can be increased by more elaborately carrying out the data sampling operation. However, such arrangement necessitates incessant signal sampling and A/D conversion. Particularly, in case where sampling is to be sequentially performed along the scanning line, the operation cannot be smoothly performed due to the limited speed of the A/D conversion. In such a case, the arrangement for the data interpolation becomes highly advantageous. The data interpolation can be accomplished on the same concept as that of the scanning line interpolation. The same also applies to the drop-out compensation.

In carrying out the signal interpolation and drop-out compensation, the digital data relative to two adjacent signals, i.e. the outputs A and B of the storage circuit 37 are arranged to be multiplied by coefficients K1 and K2 at the coefficient multiplication circuits 38 and 39, respectively, as described in the foregoing. The coefficients K1 and K2 may be expressed in the following generic formulas:

$$K1 = 1 - \frac{y}{x+1}\ K2 = \frac{y}{x+1}$$

wherein x represents a number of interpolation or compensation signals to be obtained between the above-stated two adjacent signals ($x \geq 1$); and y represents address numbers of the interpolation or compensation signals between the two adjacent signals. (Therefore, y=1, 2, 3,—.)

What is claimed is:

1. A video signal processing system comprising:
   (a) A/D converting means for analog-to-digital converting an input video signal including line interpolating signals;
   (b) storing means for storing data produced from said A/D converting means;
   (c) coefficient multiplying means for multiplying by coefficients said data stored by said storing means, said coefficients and said data are multiplied to compensate intervals between said line interpolating signals; and
   (d) designating means for designating said coefficients to such a value as that the data stored by said storing means are interpolated.

2. The system according to claim 1, further comprising: addition means for adding a plurality of data which are multiplied by said coefficients at said coefficient multiplying means.

3. The system according to claim 1, wherein said designating means designates the coefficients K1 and K2 to be used for multiplying the data relative to two adjacent signals which are to be used for obtaining an interpolation signal between them, according to the following formula:

$$K1 = 1 - \frac{y}{x+1} \text{ and } K2 = \frac{y}{x+1}$$

were x represents a number of interpolation signals to be obtained between said two adjacent signals and is an integer no smaller than 1, and y represents the address numbers of said interpolation signals between said two adjacent signals and, therefore, y=1, 2, 3,—.

4. The system according to claim 3, further comprising: addition means for adding the data which are multiplied by said coefficients at said coefficient multiplying means.

5. The system according to claim 1, further comprising: sampling means for sampling said input video signal; said A/D converting means being arranged to analog-to-digital convert the video signal sampled by said sampling means.

6. The system according to claim 5, further comprising: sampling control means for controlling timing for the sampling operation of said sampling means on said signal, said sampling control means being arranged to control said sampling timing in such a manner as to have skew compensation also effected thereby.

7. The system according to claim 6, further comprising:
   video signal supply means for repeatedly supplying said field video signals to said sampling means at a predetermined period.

8. The system according to claim 7, wherein said video signal supply means includes reproducing means for repeatedly reproducing said field video signal from a record bearing medium on which said field video signal is recorded.

9. The system according to claim 8, wherein said record bearing medium is a rotating type record bearing medium; and said video signal supply means further includes rotating means for rotating said record bearing medium at a predetermined constant speed relative to said reproducing means.

10. The system according to claim 5, further comprising: reproducing means for reproducing said video signal from a record bearing medium on which said video signal is recorded; said sampling means being arranged to receive a video signal reproduced from said record bearing medium by said reproducing means.

11. The system according to claim 10, wherein said record bearing medium is a rotating type record bearing medium; and said system further comprises rotating means for rotating said record bearing medium.

12. A video signal processing system comprising:
   (a) A/D converting means for analog-to-digtal converting an input video signal including a drop-out;
   (b) storing means for storing data produced from said A/D converting means;
   (c) coefficient multiplying means for multiplying said data stored by said storing means by coefficients, said coefficients and said data are multiplied to compensate said drop-out; and
   (d) designating means arranged for designating said coefficients to such a value as that the drop-out of said data stored by said storing means is compensated.

13. The system according to claim 12, further comprising: addition means for adding a plurality of data which are multiplied by said coefficients at said coefficient multiplying means.

14. The system according to claim 12, wherein said designating means designates the coefficients K1 and K2 to be used for multiplying the data relative to two adjacent signals which are to be used for obtaining an interpolation signal between them, according to the following formula:

$$K1 = 1 - \frac{y}{x+1} \text{ and } K2 = \frac{y}{x+1}$$

were x represents a number of interpolation signals to be obtained between said two adjacent signals and is an integer no smaller than 1, and y represents the address numbers of said interpolation signals between said two adjacent signals and, therefore, y=1, 2, 3,—.

15. The system according to claim 14, further comprising: addition means for adding the data which are multiplied by said coefficients at said coefficient multiplying means.

16. The system according to claim 12, further comprising: sampling means for sampling said input video signal; said A/D converting means being arranged to analog-to-digital convert the video signal sampled by said sampling means.

17. The system according to claim 16, further comprising: reproducing means for reproducing said video signal from a record bearing medium on which said video signal is recorded; said sampling means being arranged to receive a video sigral reproduced from said record bearing medium by said reproducing means.

18. The system according to claim 17, wherein said record bearing medium is a rotating type record bearing medium; and said system further comprises rotating means for rotating said record bearing medium.

19. A method for processing a video signal, comprising the steps of:
    (a) analog-to-dgital converting an input signal including line interpolating signals;
    (b) storing digital data obtained by said analog-to-digital conversion;
    (c) indicating coefficient by which said stored data are to be multiplied to compensate for intervals between said interpolating signals; and
    (d) multiplying said stored data by said indicated coefficients.

20. The method according to claim 19, further comprising the step of:
    adding a plurality of said data multiplied by said coefficients.

21. The method according to claim 19, wherein at said indicating step, the eoefficients K1 and K2 to be used for multiplying the data relative to two adjacent signals which are to be used for obtaining an interpolation signal between them are indicated according to the following formula:

$$K1 = 1 - \frac{y}{x+1} \text{ and } K2 = \frac{y}{x+1}$$

where x represents a number of interpolation signals to be obtained between said two adjacent signals and is an integer no smaller than 1, and y represents the address numbers of said interpolation signals between said two adjacent signals and, therefore, y=1, 2, 3,—.

22. The method according to claim 21, further comprising the step of:
    adding said data which are multiplied by said coefficients K1 and K2.

23. The method according to claim 19, further comprising the step of:
    sampling said input signal; said analog-to-digital converting step being performed on signals sampled by said sampling step.

24. The method according to claim 23, further comprising the step of:
    controlling the timing for signal sampling at the sampling step in such a manner that skew compensation is also accomplished by virtue of the controlled timing.

25. The method according to claim 24, further comprising the step of repeatedly producing one and the same field portion of said input signal, said sampling step being arranged to sample said field portion of the input signal repeatedly produced; and said sampling timing controlling step being arranged to control said sampling timing on the basis of said repeatedly produced one field portion of the input signal and to have said skew compensation also accomplished by said controlled timing.

26. The method according to claim 25, wherein said field input signal producing step includes an operation of repeatedly reproducing said field input signal from a record bearing medium on which said input signal is recorded.

27. The method according to claim 26, wherein said record bearing medium is a rotating type record bearing medium; and said field input signal producing step further includes an operation of causing said record bearing medium to rotate at a predetermined speed relative to a reproducing pickup.

28. The method according to claim 23, further comprising the steps of:
    reproducing said input signal from said record bearing medium on which said input signal is recorded; and
    reproducing at said sampling step a reproduced video signal obtained through said input signal reproducing step.

29. The method according to claim 28, wherein said record bearing medium is a rotating type record bearing medium; and said input signal reproducing step includes an operation of causing said record bearing medium to rotate.

30. A method of processing a video signal, comprising:
    (a) analog-to-digital converting an input video signal including a drop-out;
    (b) storing digital data obtained by said A/D conversion;
    (c) indicating coefficients by which said stored data are to be multiplied so as to compensate for said drop-out; and
    (d) multiplying said stored data by said indicated coefficients.

31. The method according to claim 30, further comprising the step of:
    adding a plurality of said data multiplied by said coefficients.

32. The method according to claim 30, wherein at said indicating step, the coefficients K1 and K2 to be used for multiplying the data relative to two adjacent signals which are to be used for obtaining an interpolation signal between them are indicated according to the following formula:

$$K1 = 1 - \frac{y}{x+1} \text{ and } K2 = \frac{y}{x+1}$$

where x represents a number of interpolation signals to be obtained between said two adjacent signals and is an integer no smaller than 1, and y represents the address numbers of said interpolation signals between said two adjacent signals and, therefore, y=1, 2, 3,—.

33. The method according to claim 32, further comprising the step of:
adding said data which are multiplied by said coefficients K1 and K2.

34. The method according to claim 30, further comprising the step of:
sampling said input video signal; said analog-to-digital converting step being performed on signals sampled by said sampling step.

35. The method according to claim 34, further comprising the steps of :
reproducing said video signal from a record bearing medium on which said video signal is recorded; and
reproducing at said sampling step a reproduced video signal obtained through said video signal reproducing step.

36. The method according to claim 35, wherein said record bearing medium is a rotating type record bearing medium; and said video signal reproducing step includes an operation of causing said record bearing medium to rotate.

37. A video signal processing system for processing an analog field video signal which has a length an odd number of times as long as ½ of one horizontal period into a digital frame video signal, comrpising:
(a) video signal supplying means for supplying said analog field video signal at a predetermined period;
(b) sampling means for sampling said analog field video signal at a controlled sampling timing;
(c) A/D conversion means fo analog-to-digital converting sampled video signals obtained by said sampling means; and
(d) control means for controlling timing at which said video signal is sampled by said sampling means, said control means being arranged to have said sampling timing shifted to an extent of time corresponding to ½ horizontal period between the video signal supplied by said video signal supplying means for 2n−1-th time and the video signal supplied for 2n-th time.

38. The system according to claim 37, further comprising: synchronization signal producing means for producing synchronization signals related to said analog field video signal, said control means being arranged to control said sampling timing on the basis of said synchronization signals.

39. The system according to claim 38, wherein said analog field video signal includes said synchronization signals; and said synchronization signal producing means includes separating means for separating said synchronization signals from said analog field video signal.

40. The system according to claim 39, wherein said video signal supplying means includes reproducing means for repeatedly reproducing said analog field video signal from a record bearing medium on which said analog field video signal is recorded.

41. A method for processing an analog field video signal which has a length an odd number of times as long as ½ of one horizontal period into a digital frame video signal, comprising the steps of:
(a) repeatedly and continuously supplying same field signals of said analog field video signal;
(b) controlling timing at which said video signal is sampled, said controlling step being arranged to have said sampling timing shifted to an extent of time corresponding to ½ horizontal period between the video sinal produced at said video signal producing step for 2n−1-th time and the video signal produced for 2n-th time;
(c) sampling said analog field video signal at said controlled timing; and 42. The method according to claim 41, further comprising the step of:
producing synchronization signals related to said analog field video signal, said controlling step being arranged to control said sampling timing on the basis of said synchronization signals.

43. The method according to claim 42, wherein said analog field video signal includes said synchronization signals and said synchronization signal producing step includes a separating operation for separating said synchronization signals from said analog field video signal.

44. The method according to claim 43, wherein said video signal producing step includes an operation of repeatedly reproducing said analog field video signal from a record bearing medium on which said analog field video signal is recorded.

* * * * *